United States Patent
Subramaniam et al.

(10) Patent No.: US 11,100,028 B1
(45) Date of Patent: Aug. 24, 2021

(54) PROGRAMMABLE I/O SWITCH/BRIDGE CHIPLET

(71) Applicant: Apex Semiconductor

(72) Inventors: Suresh Subramaniam, San Jose, CA (US); Alfred Yeung, San Jose, CA (US)

(73) Assignee: Apex Semiconductor, San Jose, CA (US)

( * ) Notice: Subject to any disclaimer, the term of this patent is extended or adjusted under 35 U.S.C. 154(b) by 0 days.

(21) Appl. No.: 16/858,871

(22) Filed: Apr. 27, 2020

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01); *G06F 2213/0026* (2013.01)

(58) Field of Classification Search
CPC .................. G06F 13/4027; G06F 13/4221
See application file for complete search history.

(56) References Cited

U.S. PATENT DOCUMENTS

| | | | |
|---|---|---|---|
| 9,274,938 B2 | 3/2016 | Searles et al. | |
| 10,209,306 B2 | 2/2019 | Motika et al. | |
| 10,579,547 B2 | 3/2020 | Balle et al. | |
| 2006/0190659 A1* | 8/2006 | Biran | G06F 13/4059 710/310 |
| 2007/0223388 A1* | 9/2007 | Arad | H04L 43/106 370/252 |
| 2008/0181212 A1* | 7/2008 | Curcio | H04L 12/66 370/389 |
| 2011/0225337 A1* | 9/2011 | Byrne | G06F 13/4027 710/306 |
| 2015/0089099 A1* | 3/2015 | Huber | G06F 13/16 710/105 |
| 2017/0220509 A1* | 8/2017 | Kaviani | G06F 13/4031 |
| 2018/0102338 A1* | 4/2018 | McLellan | H01L 25/0652 |
| 2018/0181524 A1* | 6/2018 | Schulz | G06F 13/4045 |
| 2020/0133902 A1* | 4/2020 | Tang | G06F 13/20 |
| 2020/0334036 A1* | 10/2020 | Shimura | G06F 9/223 |

OTHER PUBLICATIONS

Olofsson, Common Heterogeneous Integration and Intellectual Property (IP) Reuse Strategies (Chips), ERI.
Kehlet, Protocols over Die-to-Die Interfaces, OCP.
Green, Common Heterogeneous Integration and Intellectual Property (IP) Reuse Strategies (CHIPS), DARPA, Sep. 21, 2016.
Green, Heterogeneous Integration at DARPA: Pathfinding and Progress in Assembly Approaches, DARPA, May 29, 2018.

* cited by examiner

*Primary Examiner* — Tim T Vo
*Assistant Examiner* — Phong H Dang
(74) *Attorney, Agent, or Firm* — Amin, Turocy & Watson, LLP

(57) ABSTRACT

A flexible standards-based bridge or switch chiplet facilitates heterogeneous integration of chiplets that support different physical layer (PHY) interfaces and communication protocols. The bridge chiplet is configured with multiple PHY interfaces and associated adapter logic and translation logic for translation between different PHY interfaces and protocols. The bridge chiplet can be programmed to serve as a die-to-die interconnect bridge that routes data between multiple chiplets supporting different PHYs and interconnect protocols. Some embodiments of the bridge chiplet can serve solely as a PHY bridge, while others may serve as a bridge for both PHYs and protocols.

20 Claims, 14 Drawing Sheets

US 11,100,028 B1

PROGRAMMABLE I/O SWITCH/BRIDGE CHIPLET

TECHNICAL FIELD

The subject disclosure relates generally to chiplet-based integrated circuit design.

BACKGROUND

As integrated circuit (IC) designers aggregate more functions onto IC chips, the corresponding increase in size of the resulting monolithic dies has resulted in an increase in chip manufacturing costs. One approach to reducing fabrication costs as more functions are added to IC chip designs involves the use of chiplets. Chiplets are small modular chips that each embody a discrete block of functionality, and which are designed to communicatively connect to other chiplets to carry out aggregated functionality of a larger IC chip. For a given IC design, a collection of chiplets corresponding to desired functions can be selected, and these selected chiplets can be assembled and connected together—e.g., on a package substrate—to yield a completed chip, or multi-chip module (MCM).

The above-described description is merely intended to provide a contextual overview of current techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, a bridge chiplet is provided, comprising at least two ports configured to interface with respective at least two chiplets, wherein a first port of the at least two ports has a first type of physical layer (PHY) interface and a second port of the at least two ports has a second type of PHY interface; and a routing matrix configured to adapt data received at the first port via the first type of PHY interface for transport via the second type of PHY interface to yield adapted data, and to route the adapted data to the second port.

Also, according to one or more embodiments, a method for bridging between chiplets of an integrated circuit chip is provided, comprising receiving, at a bridge chiplet, data from a first chiplet via a first port of the bridge chiplet, wherein the data is received over a first type of physical layer (PHY) interface and is directed to a second chiplet connected to a second port of the bridge chiplet; and routing, by the bridge chiplet, the data to the second port, wherein the routing comprises, in response to determining that a second type of PHY interface associated with the second port is different than the first type of PHY interface associated with the first port, convert, by the bridge chiplet, the data to a format compatible with the second type of PHY interface.

In addition, an integrated circuit chip is provided, comprising a first chiplet having a first type of physical layer (PHY) interface; a second chiplet having a second type of PHY interface; and a bridge chiplet comprising a first port connected to the first chiplet, a second port connected to the second chiplet, and a routing matrix configured to adapt data received at the first port from the first chiplet via the first type of PHY interface for transport to the second chiplet via the second type of PHY interface to yield adapted data, and to send the adapted data to the second chiplet via second port.

DETAILED DESCRIPTION

Figure 1:
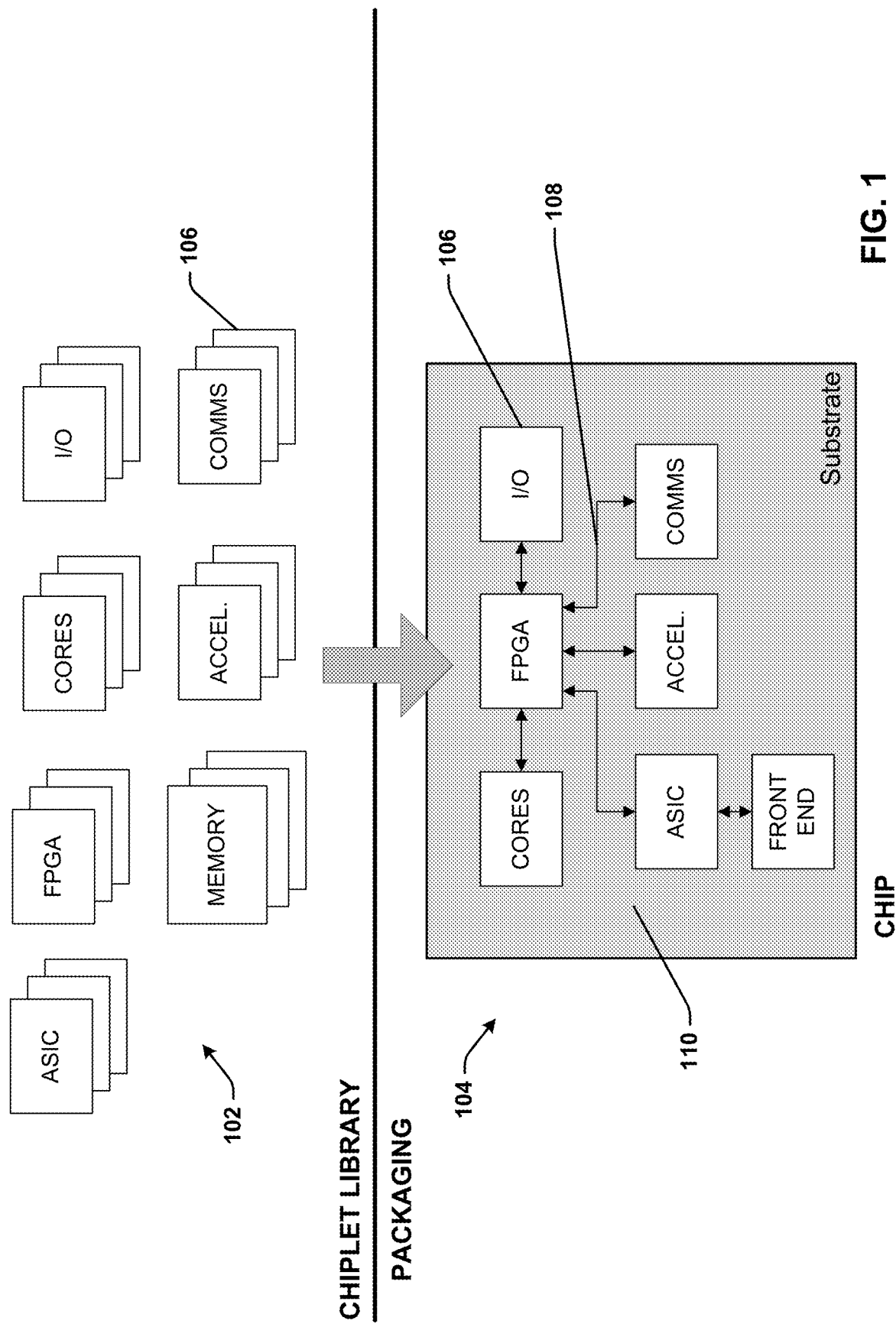
FIG. 1 is a diagram illustrating assembly and connection of chiplets to yield a larger integrated circuit (IC) chip.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

FIG. 1 is a diagram illustrating assembly and connection of chiplets 106 to yield a larger IC chip 104. In general, chiplets 106 are small modular IC chips or dies that are each designed to carry out a prescribed block of functionality, and which are configured to communicatively interface with other chiplets as part of a larger system. These chiplets 106 can be selectively assembled and connected in a package (e.g., on a substrate 110) via chiplet interconnects 108 to yield a larger IC chip 104 having the aggregate functions of the selected chiplets 106. In some design scenarios, a variety of chiplets 106 can be maintained in a chiplet library 102, and chip designers can select from among the chiplets 106 in this library 102 for inclusion in a finalized chip 104, which functions as a single die that implements the aggregated functions of the selected chiplets 106.

Chiplets 106 can be designed to carry out such component functions as communication, memory, I/O, hardware acceleration, or other such functions. Some chiplets 106 can also serve as application-specific ICs (ASICs), processor cores, field programmable gate arrays (FPGAs), serializers/deserializers (SerDes), network flow processors (NFPs), reduced instruction set computers (RISCs), or other such components. The chiplet approach can allow designers to aggregate various third-party functional components—in the form of chiplets 106—in a heterogeneous manner as dictated by the larger IC chip design.

Current chiplet enablement architectures lack a flexible standards-based interconnect scheme that would allow the chiplets 106 in an IC design to talk to each other and to the outside world. Instead, current methods use proprietary chiplet interconnect architectures and protocols that are developed by large established companies, which allow these companies to address their own internal needs. While this approach may work if the partitioning of the entire IC system into subsystems is self-contained, the lack of a standardized die-to-die interconnect protocol prevents designers from mixing chiplets manufactured by different vendors to accomplish their design goals, and ultimately limits mainstream adoption of the chiplet approach. Despite ongoing efforts to define chiplet interconnect standards, it is unlikely that a single standard will emerge as a prevailing standard. Also, many established or legacy standards are still useful in some use cases, and so these standards should continue to be made available without limiting the designer to a single standard.

To address these and other issues, one or more embodiments described herein provide a flexible standards-based bridge or switch chiplet that facilitates heterogeneous integration of chiplets 106 that support different physical layer (PHY) interfaces and communication protocols. The bridge chiplet is configured with multiple PHY interfaces and associated adapter logic, translation logic, and PIPE (Physical Interface for PCI Express) adapters for translation between different PHY interfaces and protocols. The bridge chiplet can be programmed to serve as a die-to-die interconnect bridge that routes data between multiple chiplets 106 supporting different PHYs (e.g., PCIe PHY, XSR, USR, SerDes, BoW, AIB, OpenHBI, DiPort, D2D, etc.) and interconnect protocols (e.g., Tilelink, CXL, CCIX, PCIe, etc.). Some embodiments of the bridge chiplet can serve solely as a PHY bridge, while others may serve as a bridge for both PHYs and communication protocols. Bridge chiplets can enable heterogeneous chiplets 106 to communicate and interact with each other, rout route data from any chiplet to any other chiplet regardless of the PHY or interconnect protocol supported by each chiplet, and allow the chiplets 106 to communicate with applications outside the IC chip 104. Bridge chiplets can therefore be a key enabling technology that accelerates the adoption of chiplet-based design as a mainstream option for IC chip designers.

Figure 2:
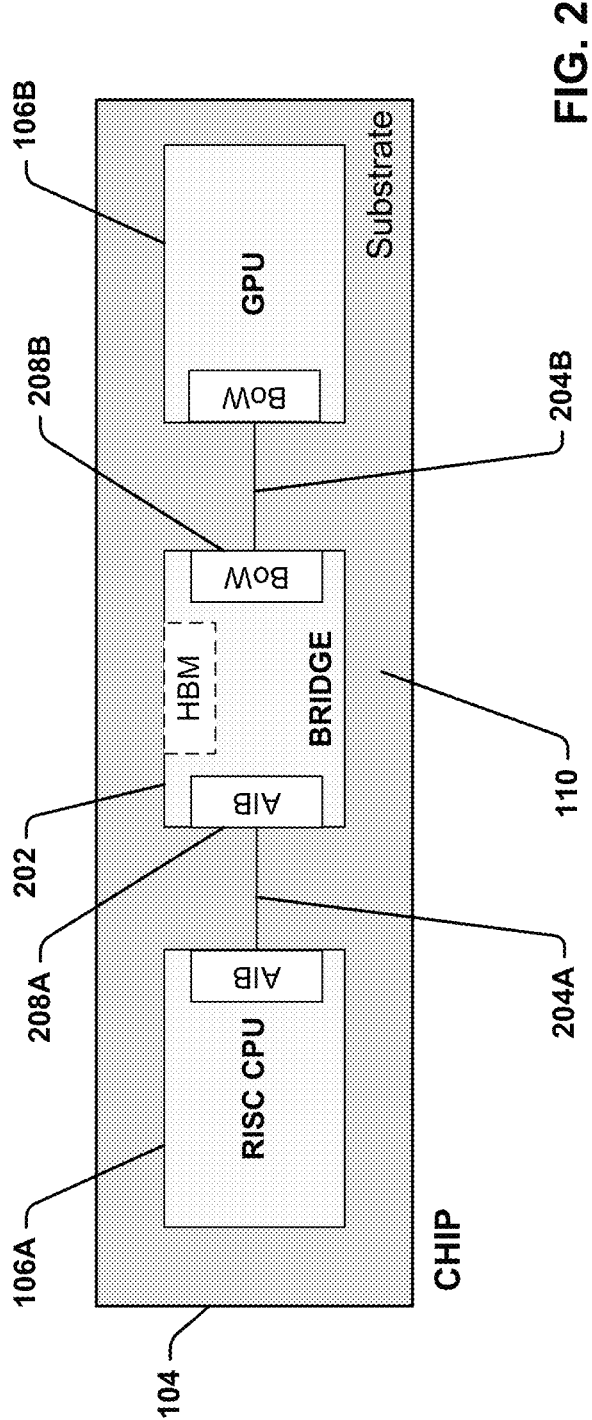
FIG. 2 is an example IC chip that includes a reduced instruction set computer (RISC) CPU chiplet connected to a graphics processing unit (GPU) chiplet via a bridge chiplet.

FIG. 2 is an example IC chip 104 that includes an RISC CPU chiplet 106A connected to a graphics processing unit (GPU) chiplet 106 via a bridge chiplet 202. In this example, chiplets 106A and 106B support different PHY interfaces—Advanced Interface Bus (AIB) in the case of chiplet 106A and Bunch of Wires (BoW) in the case of chiplet 106B. Bridge chiplet 202 includes a number of PHY interface ports 208 corresponding to different PHY interfaces, including an AIB port 208A and a BoW port 208B. In this example, the bridge chiplet's AIB port 208A is connected to chiplet 106A via a chiplet interconnect 204A on substrate 110, while the bridge chiplet's BoW port 208B is connected to chiplet 1060B via another chiplet interconnect 204B. As will be discussed in more detail below, each port 208 of the bridge chiplet 202 is associated with adapter logic and a PIPE interface (or another standardized interface) for interfacing the PHY interface with the bridge chiplet's media access control (MAC) layer. Thus, bridge chiplet 202 is capable of routing data between heterogeneous chiplets 106A and 106B even though the chiplets utilize different PHY interfaces.

Figure 3:
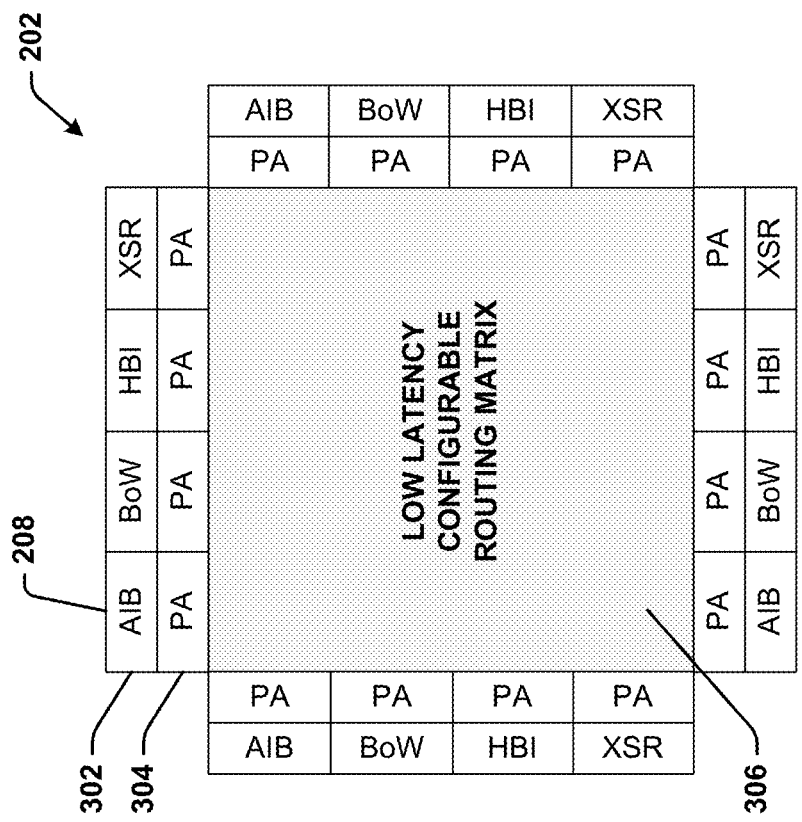
FIG. 3 is a model of an example PHY bridge chiplet.

FIG. 3 is a model of an example PHY bridge chiplet 202 according to one or more embodiments. As noted above, PHY bridge chiplet 202 comprises a number of PHY interface ports 208, each supporting a particular type of PHY interface 302. Bridge chiplet 202 can support both parallel and serial PHY interfaces. Example PHY interfaces 302 that can be supported by the bridge chiplet 202 include, but are not limited to, AIB, BoW, open high-bandwidth interconnect (OpenHBI), DiPort, peripheral component interconnect express (PCIe) PHY, extra-short reach (XSR), ultra-short reach (USR), die-to-die (D2D), or other standard or custom interfaces.

Bridge chiplet 202 also comprises a low latency configurable routing matrix 306 that can be configured to route data from any one of the interface ports 208 to any other of the interface ports 208 regardless of the types of PHY interfaces 302 associated with the ports 208. Routing matrix 306 comprises a network fabric architecture, accelerators, interconnects, or other components suitable for routing data between the ports 208. The example bridge chiplet 202 depicted in FIG. 3 supports four different types of PHY interfaces 302—AIB, BoW, HBI, and XSR—and comprises four ports 208 for each of the four PHY types, resulting in 16 ports 208 arranged in a 4×4 routing matrix. It is to be appreciated, however, that any number of PHY types can be supported by embodiments of bridge chiplet 202 without departing from the scope of this disclosure.

Figure 4:
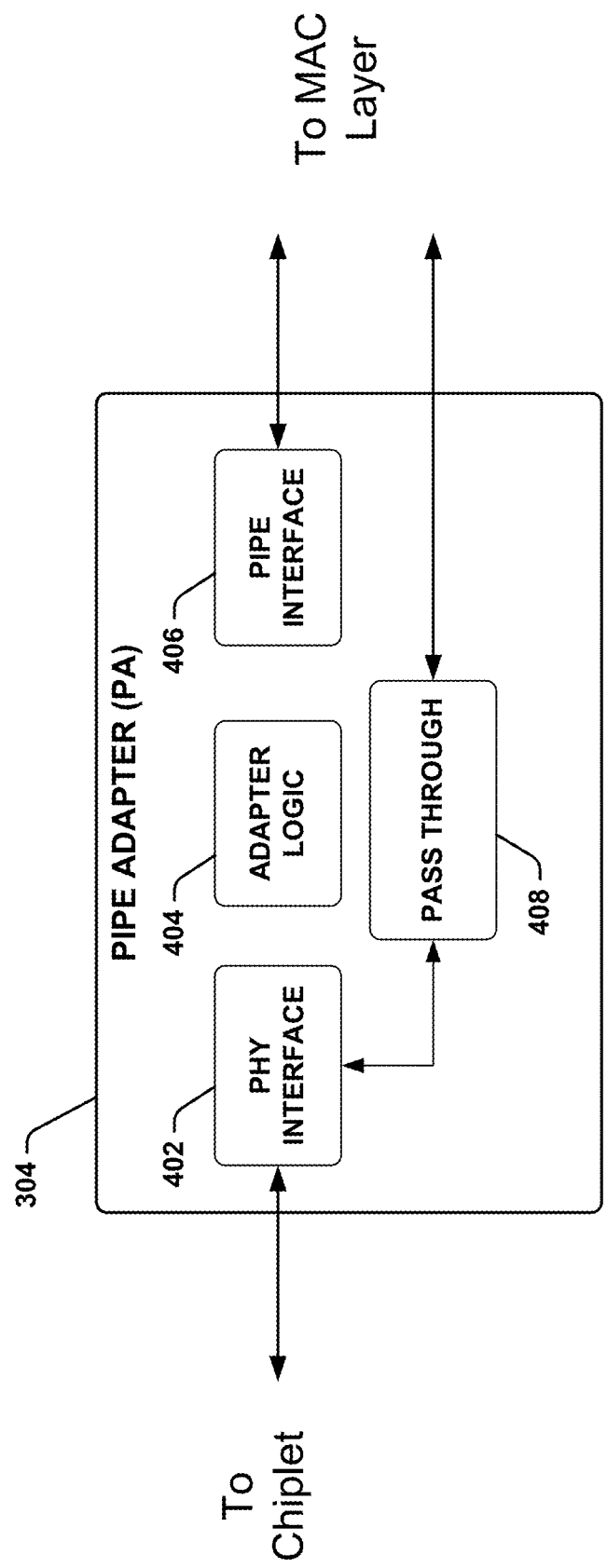
FIG. 4 is a diagram illustrating function blocks that can be implemented by a PIPE adapter of a bridge chiplet port.

Each port 208 also includes a configurable PIPE adapter (PA) 304 for interfacing the port's PHY interface 302 with the bridge chiplet's MAC layer (which itself connects to the bridge chiplet's data link layer). FIG. 4 is a diagram illustrating function blocks that can be implemented by each PIPE adapter 304 according to one or more embodiments. In general, the PIPE adapters 304 of the respective ports 208 interface the ports' PHY interfaces 302 to the bridge chiplet's MAC layer using the PIPE interface standard. Although examples described herein assume that the bridge chiplet 202 follows the PIPE specification for interfacing the bridge chiplet's link layer with PIPE-compliant PHY interfaces 302, some embodiments of the bridge chiplet 202 may utilize another standard interface between the PHY layer and the link layer. Accordingly, such embodiments may employ a suitable adapter in place of the PIPE adapter 304 for converting the PHY interfaces 302 to the appropriate standard.

The PIPE adapter 304 for a given port 208 of the bridge chiplet 202 comprises a PHY interface component 402 that physically interfaces with the corresponding PHY interface 302 of the port 208. Typically, the PHY interface component 402 will be adapted for the particular type of PHY interface 302 of the port 208 (e.g., AIB, BoW, etc.). PIPE adapter 304 also includes a PIPE interface component 406 that interfaces with the MAC layer of the bridge chiplet 202 in accordance with the PIPE interface specification.

PIPE adapter 304 also includes adapter logic 404 for converting between the PHY interface and the PIPE interface. Adapter logic 404 is specific to the type of PHY interface 302, such that the adapter logic 404 for a given port 208 converts from the PIPE interface to the port's particular PHY interface (e.g., AIB, BoW, OpenHBI, DiPort, etc.) and vice versa.

Figure 5:
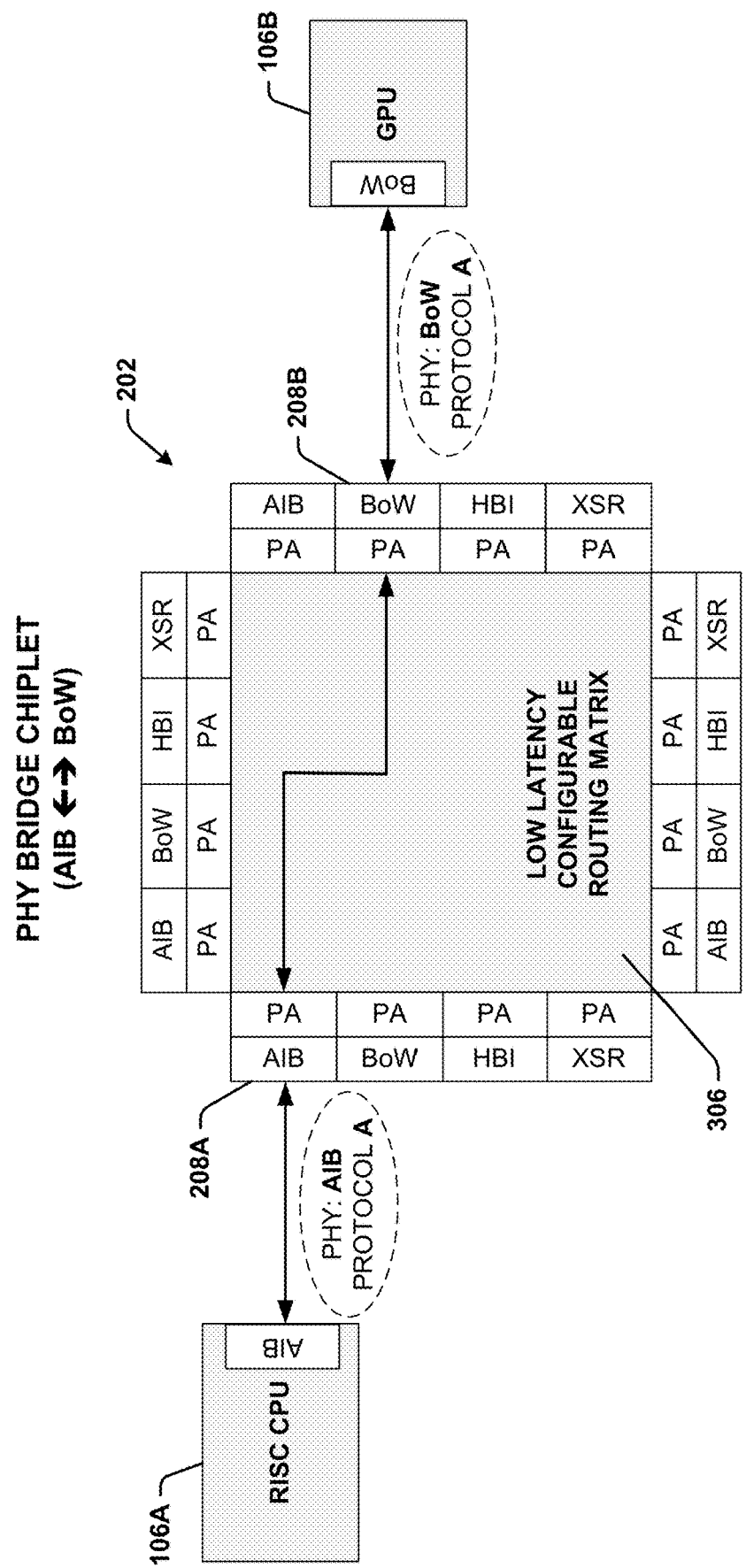
FIG. 5 is a diagram illustrating an example architecture in which a PHY bridge chiplet is used to link two chiplets.

Bridge chiplet 202 is software programmable to allow a designer to programmatically link any of the ports 208 with any of the other ports 208, thereby serving as a bridge between chiplets 106 connected to those ports 208. FIG. 5 is a diagram illustrating an example architecture in which PHY bridge chiplet 202 is used to link chiplet 106A with chiplet 106B. Chiplet 106A is an RISC CPU chiplet having an AIB PHY interface, while chiplet 106B is a GPU chiplet 106B having a BoW PHY interface. To facilitate communication between the two chiplets 106A and 106B despite the different PHY interfaces, chiplet 106A is connected to an available AIB port 208A of the bridge chiplet 202, and chiplet 106B is connected to an available BoW port 208B of the bridge chiplet 202. A system designer can configure the bridge chiplet 202 using appropriate configuration software to define a link between port 208A and 208B. This defined link causes the bridge chiplet 202 to route data between the two ports 208A and 208B, performing any necessary PHY conversions depending on the PHY interfaces 302 associated with the respective ports 208. In the example depicted in FIG. 5, data received at port 208B from chiplet 106B via the BoW interface is routed by the bridge chiplet 202 to port 208A and output via the AIB interface of port 208A to chiplet 106A. Similarly, data received via the AIB port 208A from chiplet 106A is routed by the bridge chiplet 202 to BoW port 208B and sent to chiplet 106B via the BoW interface.

To bridge the two PHY interfaces, bridge chiplet 202 can include conversion hardware and/or software that converts from any one of the supported PHY interfaces 302 to any of the other PHY interfaces 302. This conversion hardware and/or software can be embodied in the routing matrix 306 or as part of the PIPE adapters 304, and bridge chiplet 202 can enable the appropriate conversion hardware/software based on the port-to-port linkages defined by the system designer. Some embodiments of bridge chiplet 202 can support high-bandwidth memory (HBM) interfacing and can be optimized for low latency data routing. For embodiments that support HBM, bridge chiplet 202 can also include an HBM controller.

Bridge chiplets 202 can be designed to interface with chiplets 106 over any type of substrate technology or silicon interposer suitable for heterogeneous integration, including organic or silicon.

Although the example depicted in FIG. 5 assumes a one-to-one mapping between two ports 208, some embodiments of bridge chiplet 202 may also support a one-to-many mapping between ports, such that a first port 208 may be linked to multiple second ports 208 allowing data communication between the first port 208 and each of the second ports 208.

Figure 6:
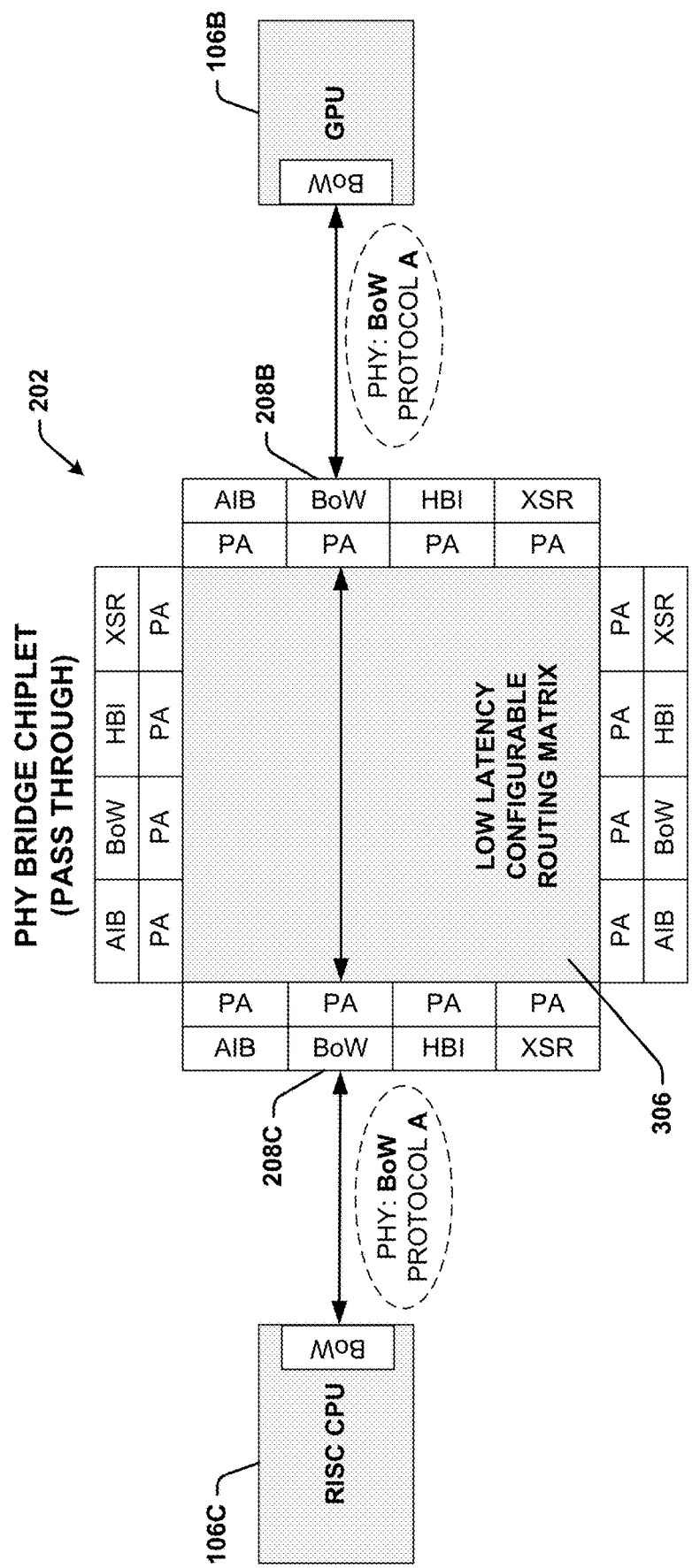
FIG. 6 is a diagram illustrating an example architecture in which a PHY bridge chiplet is used to link two chiplets that both use BoW interfaces.

In some scenarios, the bridge chiplet 202 may be used to bridge two chiplets 106 that use the same type of PHY interface 302. FIG. 6 is a diagram illustrating an example architecture in which PHY bridge chiplet 202 is used to link two chiplets 106B and 106C that both use BoW interfaces. According to this architecture, the bridge chiplet 202 serves as a pass through bridge for the two chiplets 106B and 106C without performing a PHY-to-PHY conversion on the data exchanged between the chiplets. To allow for this design option, the bridge chiplet's PIPE adapters 304 can also include a pass through component 408 (see FIG. 4) that passes data bits received at the PHY interface 302 without performing a PIPE conversion or a PHY-to-PHY conversion. The bridge chiplet 202 routes these data bits to the outgoing port 208, and the pass through component 408 of the outgoing port's PIPE adapter 304 passes the data bits to the outgoing PHY interface 302 (via routing matrix 306) without conversion.

Figure 7:
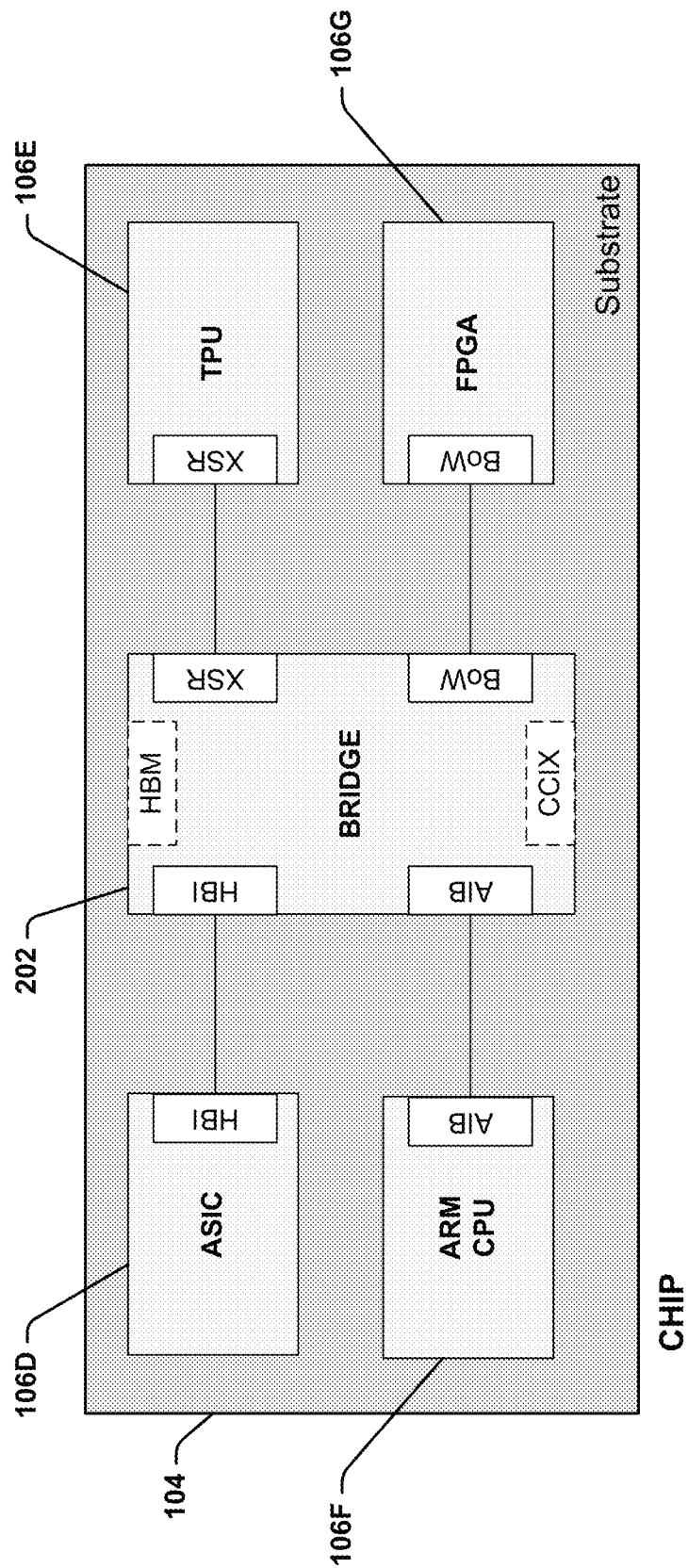
FIG. 7 depicts an example IC chip that incorporates a bridge chiplet supporting at least four types of PHY interfaces.

The features described above allow the PHY bridge chiplet 202 to serve as a configurable routing matrix that routes data between specified PHY-specific ports, performing conversions as needed between linked ports associated with different types of PHY interfaces. These features can give rise to a family of bridge chiplets that suit the needs of a wide variety of heterogeneous chiplet applications. For example, some embodiments of bridge chiplet 202 may be configured with ports 208 supporting only two types of PHY interfaces; e.g., AIB and BoW, as in the example depicted in FIG. 2. Such embodiments minimize the size of the bridge chiplet 202 for design scenarios in which is known that chiplets 106 having only two types of PHY interfaces will be used. Other bridge chiplets 202 can support more than two types of PHY interfaces. FIG. 7 depicts an example IC chip 104 that incorporates a bridge chiplet 202 supporting at least four types of PHY interfaces—HBI, AIB, XSR, and BoW. Bridge chiplet 202 can thus link four chiplets 106D-106G that each support a different one of these four PHY interfaces and route data between these heterogeneous chiplets, performing PHY-to-PHY conversions as needed. Moreover, the PHY interfaces of the bridge chiplet 202 can support a range of voltages to facilitate level translation functions when interfacing chiplets 106 that use different I/O voltages. This I/O voltage flexibility can significantly expand the designer's options for selecting and integrating a heterogeneous collection of chiplets 106, and can allow older technology nodes or legacy intellectual property (IP) cores to be integrated with newer chiplets 106 even if those components support different I/O voltages.

The examples described above assume that the chiplets 106 linked by PHY bridge chiplet 202 communicate using a common data link layer protocol; e.g., PCIe, compute express link (CXL), cache coherent interconnect for accelerators (CCIX), TileLink, or another protocol. As such, PHY bridge chiplet 202 is only required to serve as a PHY bridge without also bridging between different data link layer protocols. To minimize the complexity and size of the bridge chiplet 202 for designs in which all chiplets 106 support the same die-to-die communication protocol, embodiments of PHY bridge chiplet 202 can support PHY bridging without also performing conversion on the communication protocol. In the example depicted in FIG. 7, chiplets 106D-106G and PHY bridge chiplet 202 communicate using the CCIX protocol. In some embodiments, the protocol supported by the bridge chiplet 202 can be software configurable, allowing the designer to select from a number of supported protocols. In other embodiments, the protocol supported by bridge chiplet 202 may be fixed. In still other embodiments, bridge chiplet 202 can be configured to determine the communication protocol used by the chiplets 106—e.g., based on analysis of the formatting of the data, header information, or other characteristics of the data indicative of the communication protocol being used)—and set the communication protocol of the bridge chiplet 202 accordingly.

Figure 8:
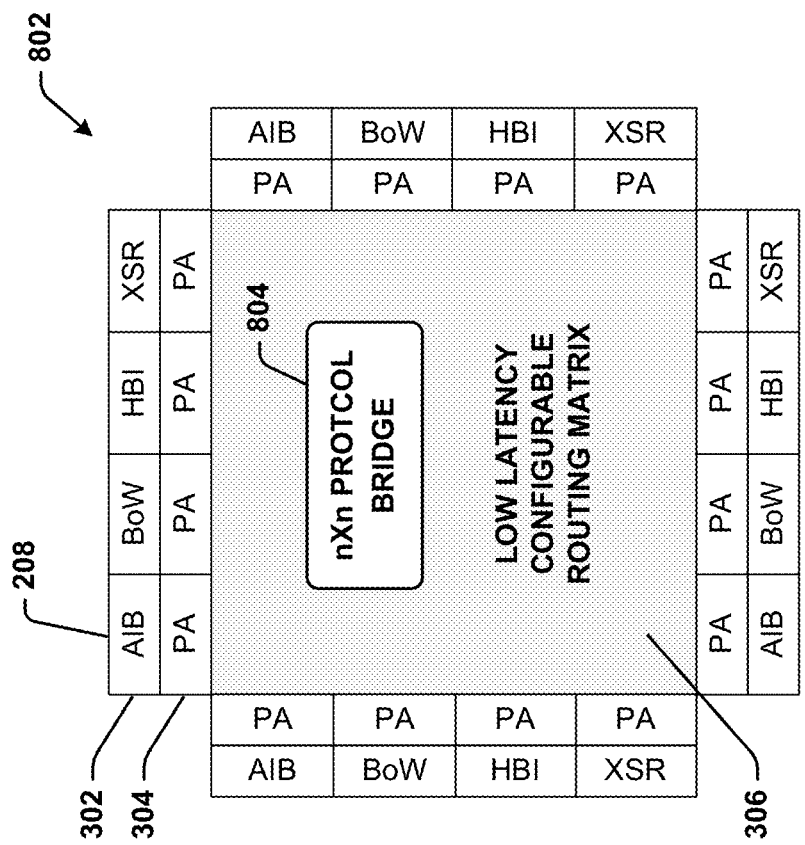
FIG. 8 is a model of an example protocol bridge chiplet.

To accommodate design scenarios in which the collection of chiplets 106 that make up an IC chip 104 comprise both heterogeneous PHY interfaces as well as heterogenous communication protocols, some embodiments of bridge chiplet 202 can be enhanced with protocol bridge capabilities to yield a protocol bridge chiplet. FIG. 8 is a model of an example protocol bridge chiplet 802 according to one or more embodiments. In general, protocol bridge chiplet 802 includes the PHY bridging functionalities of the PHY bridge chiplet 202 described above, and further incudes a protocol bridge 804 configured to convert between communication protocols. Similar to the example PHY bridge chiplet 202 depicted in FIG. 3, the example protocol bridge chiplet 802 depicted in FIG. 8 comprises 16 ports 208—four ports for each of four different PHY types—arranged in a 4×4 configuration. To accommodate protocol conversions between any two of these ports 208, protocol bridge 804 is configured as a 4×4 conversion matrix. In general, protocol bridge 804 can be configured as a n×n matrix, where n is an integer whose value depends on the number of ports 208 supported by the bridge chiplet 802.

Figure 9:
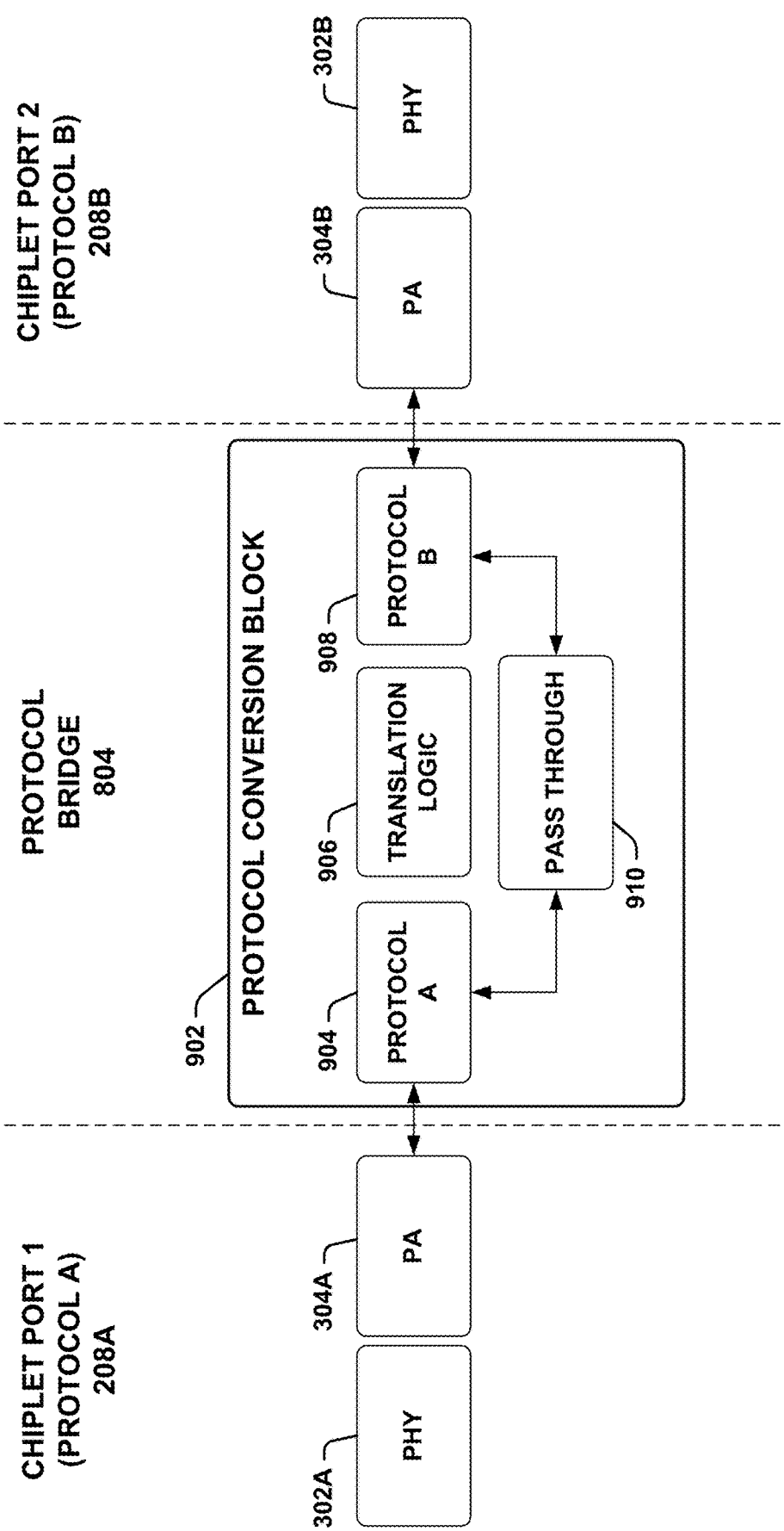
FIG. 9 is a diagram illustrating a protocol conversion block of a protocol bridge of a bridge chiplet.

FIG. 9 is a diagram illustrating a protocol conversion block 902 of protocol bridge 804 according to one or more embodiments. Protocol conversion block 902 can comprise any suitable combination of translation hardware and software for performing conversions between communication protocols. In some embodiments, protocol bridge 804 can comprise multiple protocol conversion blocks 902 which make up the n×n protocol conversion matrix, with each protocol conversion block 902 being associated with a unique pairing of ports 208. In such embodiments, a selected set of protocol conversion blocks 902 are enabled depending on which ports 208 are enabled as well as the user-defined linkages between pairs of ports 208.

In the example depicted in FIG. 9, protocol conversion block 902 is used to perform protocol bridging between two ports 208A and 208B of the protocol bridge chiplet 802. As noted above, each port 208A and 208B comprises a PHY interface 302A and 302B, as well as a PIPE adapter 304A and 304B. In this example, the PHY interfaces 302A and 302B may be of different PHY types or may be the same PHY type. However, it is assumed that the chiplets 106 (not shown in FIG. 9) that are connected to the respective ports 208A and 208B support different communication protocols for inter-chip communication on the data link layer, necessitating a protocol conversion by the protocol bridge 804. That is, port 208A is connected to a chiplet 106 that utilizes Protocol A for inter-chip communication, while port 208B is connected to a chiplet 106 that utilizes Protocol B, where Protocols A and B can be substantially any communication protocol used for inter-chip communication, including but not limited to PCIe, CXL, CCIX, TileLink, or another link layer protocol.

If the PHY interfaces 302A and 302B are different PHY types, protocol bridge chiplet 802 performs the necessary PHY bridging as discussed above in connection with PHY bridge chiplet 202. Alternatively, if the PHY interfaces 302A and 302B are the same PHY type, the pass through components 408 of the respective PIPE adapters 304A and 304B are used as discussed above.

Protocol conversion block 902 includes a Protocol A component 904 that exchanges data with port 208A using Protocol A, and a Protocol B component 908 that exchanges data with port 208B using Protocol B. Protocol conversion block 902 also includes translation logic 906 for translating between Protocol A and Protocol B, thereby performing protocol bridging between the two ports 208A and 208B. That is, data received at the Protocol A component 904 from port 208A is translated by the translation logic 906 from Protocol A to Protocol B, and the resulting translated data is sent to port 208B via the Protocol B block 908. In the reverse direction, data received at the Protocol B component 908 from port 208B is translated by the translation logic 906 from Protocol B to Protocol A, and the resulting translated data is sent to port 208A via the Protocol A component 904.

The specific protocols corresponding to Protocol A and Protocol B can be software configurable for each protocol conversion block 902. For example, a system designer can submit configuration input that defines the protocol used by each port of the bridge chiplet 802. Based on the user-specified protocols corresponding to Protocol A and Protocol B for a given pair of ports 208, bridge chiplet 802 configures the translation logic 906 for that pair's protocol conversion block 902 to appropriately translate between the two specified protocols. Alternatively, in some embodiments, protocol conversion block 902 can be configured to recognize the communication protocols being used at the respective ports 208 based on characteristics of the received data (e.g., headers, data formatting, or other characteristics of the data indicative of the communication protocol being used), and to automatically configure the translation logic 906 based on the recognized protocols.

If the chiplets 106 connected to the respective ports 208A and 208B already share a common protocol, data received at the protocol conversion block 902 from either of the ports can be routed through a pass through component 910 of the protocol conversion block 902 that bypasses the translation logic 906, or otherwise disable the translation logic 906 to prevent protocol translation.

Figure 10:
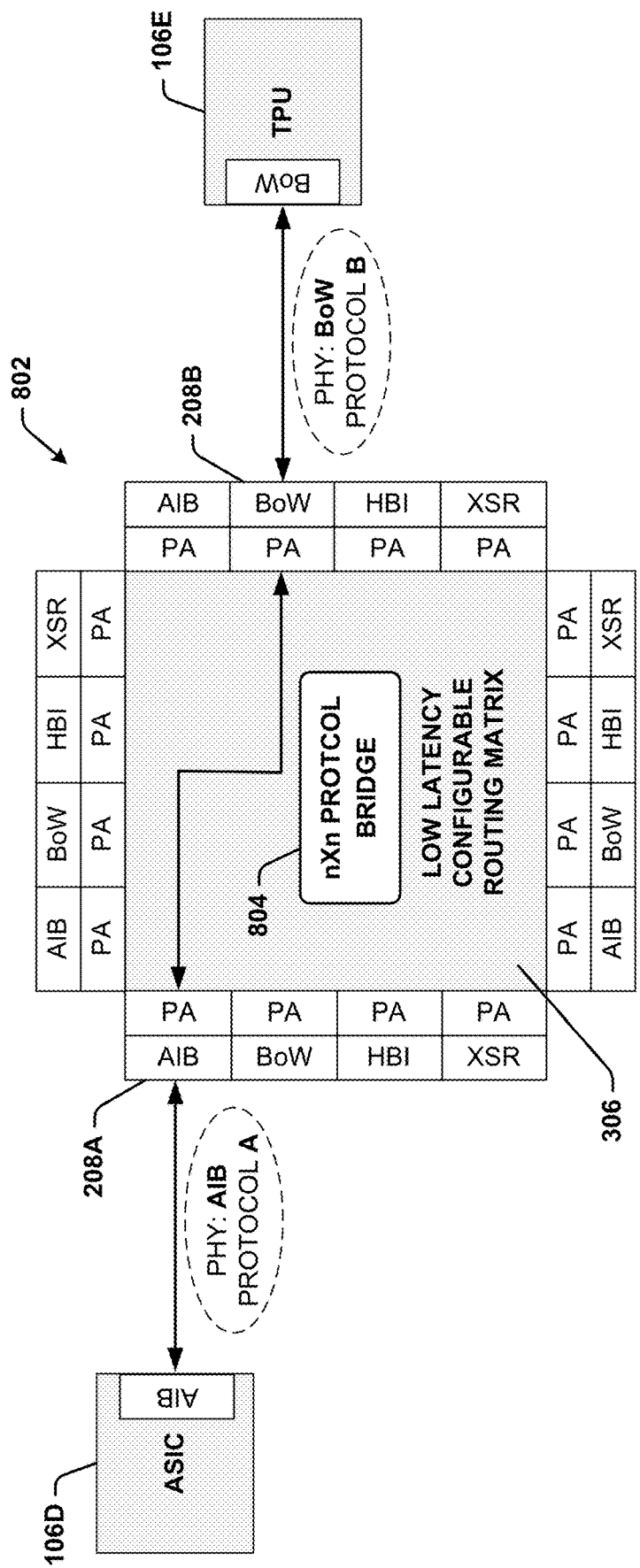
FIG. 10 is a diagram illustrating an example architecture in which a protocol bridge chiplet is used to link two chiplets.

FIG. 10 is a diagram illustrating an example architecture in which protocol bridge chiplet 802 is used to link chiplet 106D with chiplet 106E. Since protocol bridge chiplet 802 is capable of bridging both heterogeneous PHY interface types as well as heterogeneous communication protocols, embodiments of protocol bridge chiplet 802 can serve as a high-bandwidth protocol bridge that bridges the protocol layer (e.g., the link, network, and/or transport layers) to the PHY layer, allowing any protocol to be bridged to any PHY type (e.g., TileLink to AIB, TileLink to PCIe, CXL to PCIe, CXL to USR, TileLink to a custom protocol, etc.). Thus, given a set of PHY interfaces and protocols supported by a given protocol bridge chiplet 802, any combination of protocol-to-PHY bridging can be supported. In the example depicted in FIG. 10, protocol bridge chiplet 802 is used to bridge an AIB interface that communicates using Protocol A (chiplet 106D) and a BoW interface that communicates using Protocol B (chiplet 106E). As in the case of PHY interfaces, some embodiments of bridge chiplet 802 can support only two different protocols, while other embodiments may support more than two protocols. Thus, a broad family of bridge chiplets 802 having various numbers of supported PHYs and/or protocols can be made available to suit needs of a given IC chip design.

Figure 11:
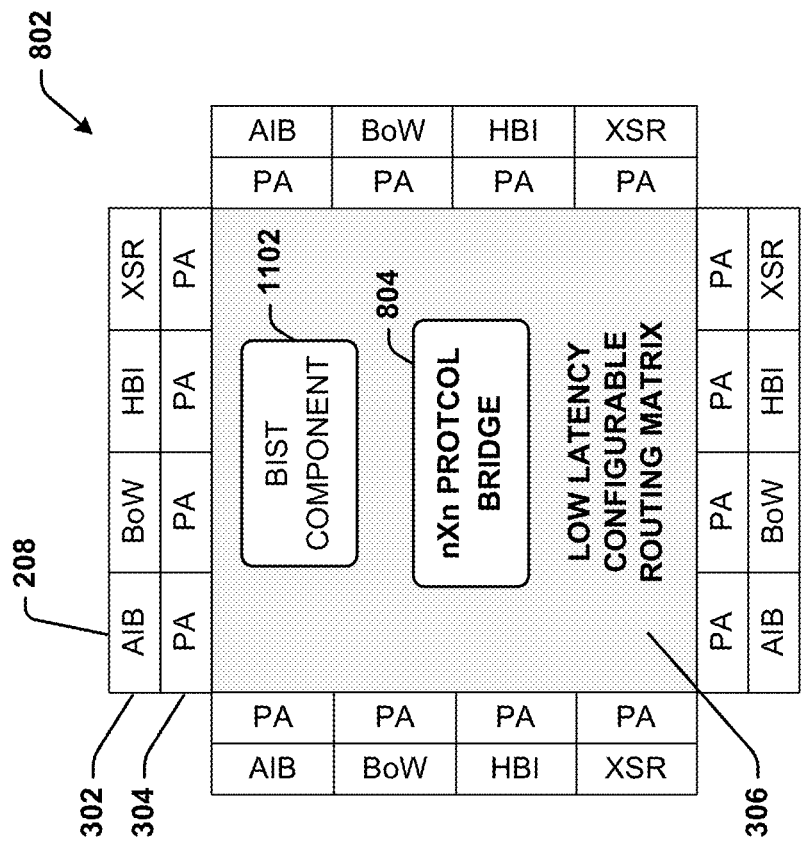
FIG. 11 is a model of an example protocol bridge chiplet that supports built-in self-test (BIST) capabilities.

FIG. 11 is a model of an example protocol bridge chiplet 802 that supports built-in self-test (BIST) capabilities according to one or more embodiments. Some embodiments of PHY bridge chiplet 202 and protocol bridge chiplet 802 can include a BIST component 1102 configured to execute BIST routines that test and verify the integrity of chiplet-to-chiplet interfaces. An example BIST routine can generate and send test protocol packets to selected ports 208 and measure return data packets from the ports to verify connectivity to chiplets 106 connected to those ports 208. Some embodiments of bridge chiplets 202 and 802 can also include a test access port (TAP) to facilitate easy readout of test registers (e.g., test registers that store results of the BIST) and to minimize test time.

PHY bridge chiplet 202 and protocol bridge chiplet 802 can also include I/O (e.g., SerDes I/O) for diagnostics and high-bandwidth read-out of functional testing between different chiplets 106.

Figure 12:
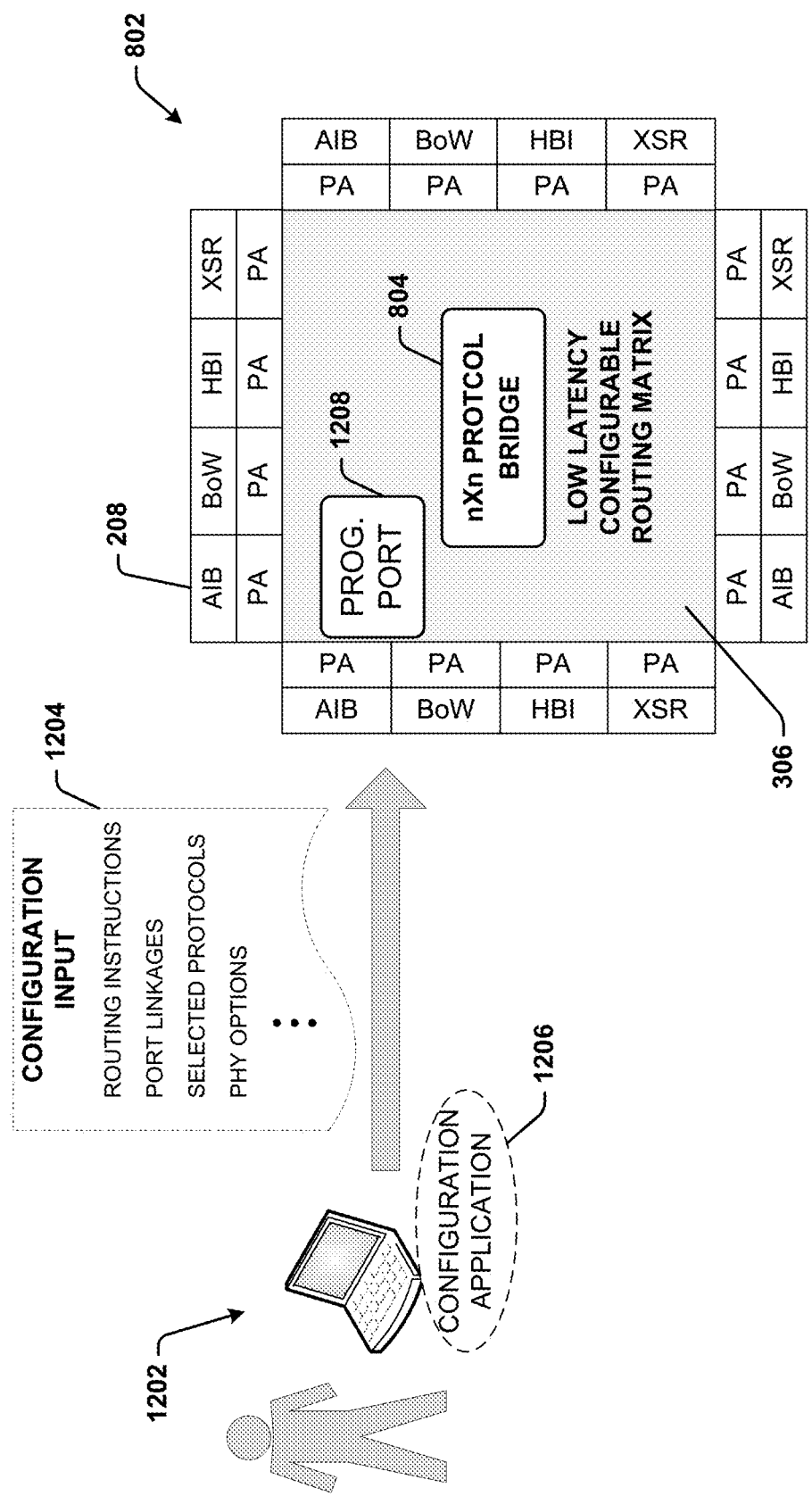
FIG. 12 is a diagram illustrating configuration of an example protocol bridge chiplet.

As noted above, PHY bridge chiplet 202 and protocol bridge chiplet 802 can be configured using suitable configuration software to function in accordance with the requirements of a given IC chip design comprising heterogenous chiplets 106. FIG. 12 is a diagram illustrating configuration of an example protocol bridge chiplet 802. In this example, bridge chiplet 802 stores and manages a number of configuration registers that set various configuration options for the bridge chiplet 802. Values of these registers can be set by a system designer using an appropriate configuration application 1206 executing on a client device 1202 (e.g., a laptop computer, a desktop computer, a tablet device, a programming station of a chip production line, etc.). To facilitate configuration of the bridge chiplet 802, client device 1202 can be communicatively interfaced with the bridge chiplet 802—e.g., via a programming port of the bridge chiplet 802—and a system designer can use the configuration application 1206 to submit configuration input 1204 that sets values of selected configuration registers as desired.

For example, configuration input 1204 can be submitted that defines port-to-port routing instructions for the bridge chiplet 802. In some embodiments, this can be done by defining linkages or associations between selected pairs ports 208 (e.g., a link between port 208A and 208B in the example depicted in FIG. 5), which instructs the bridge chiplet 802 that the indicated pair of ports 208 are to be bridged. Configuration input 1204 can also specify the communication protocols that will be associated with each of the indicated ports 208 (as dictated by the protocols of the chiplets 106 that will be connected to each port 208), thereby configuring the translation logic 906 of the protocol bridge 804 to appropriately convert between the two indicated protocols. In some embodiments in which the PHY type of each port 208 is software-configurable, configuration input 1204 can also define the PHY type of each port 208.

Each PHY interface 304 of the bridge chiplets 202, 802 may also have a number of PHY-specific configuration options that can be set via configuration input 1204. Such configurable PHY options can include, but are not limited to, a type of the PHY interface, a number of lanes, a number of bits per lane, a per-lane and per-bit deskew, first-in-first out (FIFO) options, source synchronous clocking (single data rate or double data rate), enablement of phase locked loops, or other such PHY configuration options.

PHY bridge chiplets 202 and protocol bridge chiplets 802 can be implemented using any suitable technology node or technology type (e.g., 10 nm, 14 nm, 16 nm, 22 nm, etc.). Also, in some embodiments, some or all components of the bridge chiplets 202, 802—e.g., the pipe adapter, routing logic, PHY interface, protocols, etc.—can be implemented using FPGAs. In addition to implementation as dedicated bridge chiplets 202, 802, some or all of the bridging functions described above can also be implemented within other third-party chiplets within or without a system-on-chip (SoC).

The functionality of bridge chiplets 202, 802 described herein can provide a scalable, programmable family of IO Bridge/switch chiplets that allows chiplet vendors to design their chiplets to utilize their preferred interconnect of choice, in terms of PHY and protocol. This family of bridge chiplets 202, 802 can allow these heterogeneous chiplets to interact with other chiplets over established or emerging standards and protocols. Moreover, bridge chiplets 202, 802 can allow a systems architect to design novel and innovative solutions since the bridge chiplets 202,802 are bandwidth and latency optimized to make solutions compelling. These bridge chiplets 202, 802 can find a wide variety of uses in computing, networking, and storage industries, or in any system solution requiring integration of heterogeneous chiplets from different vendors with different connectivity interfaces.

Figure 13:
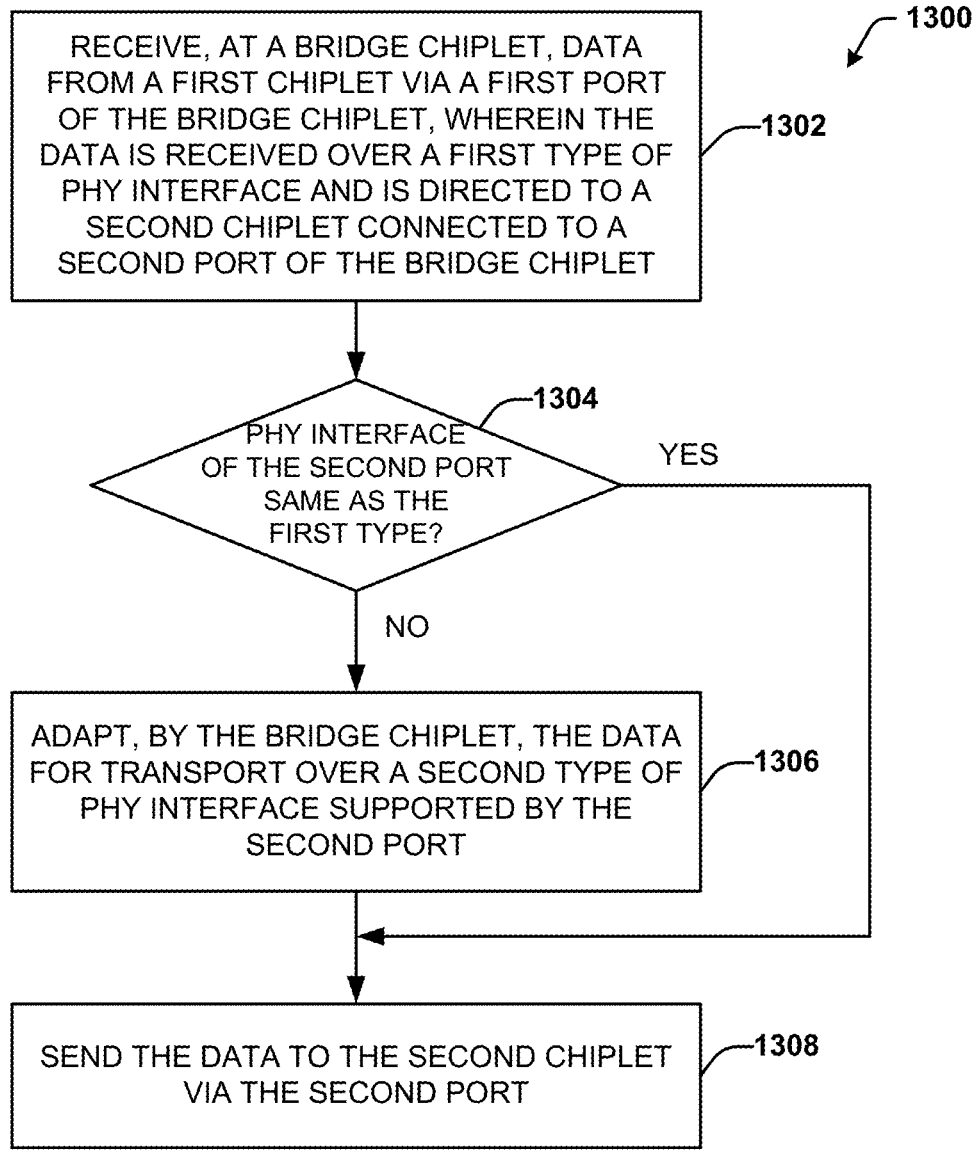
FIG. 13 illustrates a flow diagram of an example, non-limiting embodiment of a method for bridging PHY interfaces of two chiplets that are integrated as part of a large IC chip system.
Figure 14:
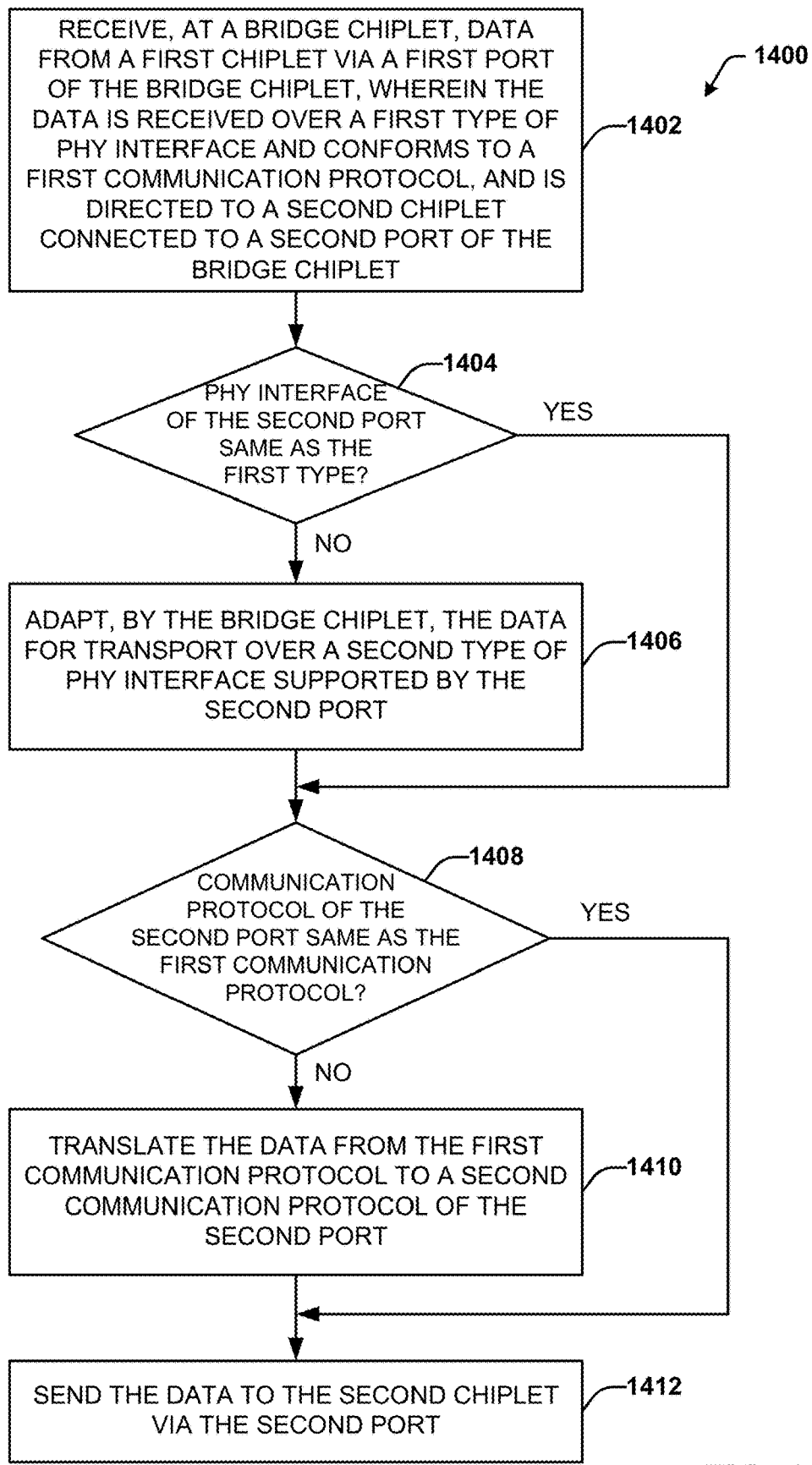
FIG. 14 illustrates a flow diagram of an example, non-limiting embodiment of a method for bridging PHY interfaces and communication protocols of two chiplets that are integrated as part of a large IC chip system.

In view of the example systems described above, methods that may be implemented in accordance with the described subject matter may be better appreciated with reference to the flowcharts of FIGS. 13-14. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. The methods described below can be implemented using hardware, software, or a combination of hardware and software implemented as on-board components of a memory architecture.

FIG. 13 is a flow diagram of an example, non-limiting methodology 1300 for bridging PHY interfaces of two chiplets that are integrated as part of a large IC chip system. Methodology 1300 begins at step 1302, where data is received at a bridge chiplet from a first chiplet via a first port of the bridge chiplet. The data is received over a first type of PHY interface, which corresponds to a PHY interface of the first chiplet from which the data originates. Example PHY interface types can include, but are not limited to, PCIe PHY, AIB, BoW, OpenHBI, DiPort, XSR, USR, D2D, or another type of PHY interface. The data is directed to a second chiplet connected to a second port of the bridge chiplet.

At 1304, a determination is made as to whether the PHY interface of the second port is the same as the first type of PHY interface of the first port. If the PHY interface of the second port is not the same as that of the first port (NO at step 1304), the methodology proceeds to step 1306, where the bridge chiplet adapts the data for transport over a second type of PHY interface supported by the second port. At 1308, the bridge chiplet sends the data to the second chiplet via the second port.

If the PHY interface of the second port is of the same type as that of the first port (YES at step 1304), the methodology proceeds from step 1304 to 1308 without performing the adaption step of step 1306 (a pass through scenario).

FIG. 14 is a flow diagram of an example, non-limiting methodology 1400 for bridging PHY interfaces and communication protocols of two chiplets that are integrated as part of a large IC chip system. Methodology 1400 begins at step 1402, where data is received at a bridge chiplet from a first chiplet connected to a first port of the bridge chiplet, the data being directed to a second chiplet connected to a second port of the bridge chiplet. The data is received over a first type of PHY interface (e.g., PCIe PHY, AIB, BoW, OpenHBI, DiPort, XSR, USR, D2D, etc.), which corresponds to a PHY interface of the first chiplet from which the data originates. The data is transported according to a first communication protocol supported by the first chiplet. Example communication protocols include, but are not limited to, PCIe, CXL, CCIX, TileLink, or another protocol.

At 1404, a determination is made as to whether the PHY interface of the second port is the same as the first type of PHY interface of the first port. If the PHY interface of the second port is not the same as that of the first port (NO at step 1404), the methodology proceeds to step 1406, where the bridge chiplet adapts the data for transport over a second type of PHY interface supported by the second port. The methodology then proceeds to step 1408. Alternatively, if the PHY interface of the second port is the same type as that of the first port (YES at step 1404), the methodology proceeds to step 1408 without performing adapting the data at step 1406 (a PHY pass through scenario).

At 1408, a determination is made as to whether the communication protocol of the second port is the same as the first communication protocol. In some embodiments, the communication protocol of the second port may be pre-defined by a system designer using appropriate bridge chiplet configuration settings. Alternatively, the bridge chiplet may automatically detect the protocol being used by the second port, which may be a function of the protocol supported by the second chiplet connected to the second port. If the communication protocol of the second port is not the same as the first protocol (NO at step 1408), the methodology proceeds to step 1410, where the bridge chiplet translates the data from the first communication protocol to a second communication protocol. The methodology then proceeds to step 1412. If the communication protocol of the second port is the same as the first communication protocol (YES at step 1408), the methodology proceeds directly to step 1412 without performing the translation at step 1410 (a pass through scenario). At 1412, the bridge chiplet sends the data to the second chiplet via the second port.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A bridge chiplet, comprising:
multiple ports configured to interface with respective chiplets, wherein at least two of the multiple ports have respective different types of physical layer (PHY) interfaces;
a programming port configured to receive configuration input data that sets one or more configuration settings of the bridge chiplet, wherein the one or more configuration settings comprise at least an instruction to route data between two ports, of the multiple ports, specified by the configuration input data, and wherein a first port of the two ports has a first type of PHY interface and a second port of the two ports has a second type of PHY interface; and
a routing matrix configured to, based on the configuration input data, adapt data received at the first port via the first type of PHY interface for transport via the second type of PHY interface to yield adapted data, and to route the adapted data to the second port.

2. The bridge chiplet of claim 1, wherein the first type of PHY interface or the second type of PHY interface is one of Advanced Interface Bus (AIB), Bunch of Wires (BoW), open high-bandwidth interconnect (OpenHBI), DiPort, peripheral component interconnect express (PCIe) PHY, extra-short reach (XSR), ultra-shot reach (USR), or die-to-die (D2D).

3. The bridge chiplet of claim 1, wherein a port of the multiple ports comprises an adapter that interfaces a PHY interface of the port with a media access control (MAC) layer of the bridge chiplet.

4. The bridge chiplet of claim 1, further comprising a protocol bridge configured to convert the adapted data from a first communication protocol of the first port to a second communication protocol of the second port to yield protocol-adapted data, and to route the protocol-adapted data to the second port.

5. The bridge chiplet of claim 4, wherein the first communication protocol or the second communication protocol is one of peripheral component interconnect express (PCIe), compute express link (CXL), cache coherent interconnect for accelerators (CCIX), TileLink, or a custom protocol.

6. The bridge chiplet of claim 4, wherein the protocol bridge is further configured to, in response to determining that the first port and the second port are configured to communicate using a same communication protocol, route the adapted data to the second port without converting the adapted data from the first communication protocol to the second communication protocol.

7. The bridge chiplet of claim 4, wherein the one or more configuration settings further comprise at least one of a selection of the first communication protocol associated with the first port, a selection of the second communication protocol associated with the second port, or a communication option of the PHY interface of the first port or the second port.

8. The bridge chiplet of claim 4, further comprising a built-in self-test component configured to generate and send test protocol packets to the first port and the second port and to verify communication to the first chiplet and the second chiplet based on a measurement of return data packets from the first port and the second port in response to the test protocol packets.

9. A method for bridging between chiplets of an integrated circuit chip, comprising:
setting, by a bridge chiplet comprising multiple ports configured to interface with respective chiplets, one or more configuration settings of the bridge chiplet in accordance with configuration input data received via a programming port of the bridge chiplet, wherein the one or more configuration settings comprise at least an instruction to route data between two ports, of the multiple ports, specified by the configuration input data, and wherein a first port of the two ports has a first type of PHY interface and a second port of the two ports has a second type of PHY interface;
receiving, at the bridge chiplet, data from a first chiplet via the first port, wherein the data is received over the first type of PHY interface; and
routing, by the bridge chiplet based on the configuration input data, the data to the second port,
wherein the routing comprises:
in response to determining that the second type of PHY interface associated with the second port is different than the first type of PHY interface associated with the first port, converting, by the bridge chiplet, the data to a format compatible with the second type of PHY interface.

10. The method of claim 9, wherein the converting comprises converting the data to a format compatible with at least one of Advanced Interface Bus (AIB), Bunch of Wires (BoW), open high-bandwidth interconnect (OpenHBI), DiPort, peripheral component interconnect express (PCIe) PHY, extra-short reach (XSR), ultra-shot reach (USR), or die-to-die (D2D).

11. The method of claim 9, wherein the routing further comprises:
converting, by the bridge chiplet, the data from a first communication protocol supported by the first chiplet to a second communication protocol supported by the second chiplet to yield protocol-adapted data.

12. The method of claim 11, wherein the converting to the second communication protocol comprises converting to at least one of peripheral component interconnect express (PCIe), compute express link (CXL), cache coherent interconnect for accelerators (CCIX), TileLink, or a custom protocol.

13. The method of claim 11, further comprising, in response to determining that the first port and the second port are configured to communicate using a same communication protocol, bypassing the converting of the data from the first communication protocol to the second communication protocol.

14. The method of claim 11,
wherein, the one or more configuration settings further comprise at least one of a selection of the first communication protocol associated with the first port, a selection of the second communication protocol associated with the second port, or a communication option of the PHY interface of the first port or the second port.

15. The method of claim 11, further comprising:
generating and sending, by the bridge chiplet, test protocol packets to the first port and the second port as part of a built-in self-test routine; and
verifying, by the bridge chiplet, communication to the first chiplet and the second chiplet based on a measurement of return data packets from the first port and the second port in response to the test protocol packets.

16. An integrated circuit chip, comprising:
a first chiplet having a first type of physical layer (PHY) interface;
a second chiplet having a second type of PHY interface; and
a bridge chiplet comprising:
multiple ports;
a programming port configured to receive configuration input data that sets one or more configuration settings of the bridge chiplet, wherein the one or more configuration settings comprise at least an instruction to route data between two ports, of the multiple ports, specified by the configuration input data, and wherein a first port of the two ports has the first type of PHY interface and a second port of the two ports has the second type of PHY interface; and
a routing matrix configured to adapt, based on the configuration input data, data received at the first port from the first chiplet via the first type of PHY interface for transport to the second chiplet via the second type of PHY interface to yield adapted data, and to send the adapted data to the second chiplet via second port.

17. The integrated circuit chip of claim 16, wherein the first type of PHY interface or the second type of PHY interface is one of Advanced Interface Bus (AIB), Bunch of Wires (BoW), open high-bandwidth interconnect (OpenHBI), DiPort, peripheral component interconnect express (PCIe) PHY, extra-short reach (XSR), ultra-shot reach (USR), or die-to-die (D2D).

18. The integrated circuit chip of claim 16, wherein the bridge chiplet further comprises a protocol bridge configured to convert the adapted data from a first communication protocol supported by the first chiplet to a second communication protocol supported by the second chiplet to yield protocol-adapted data, and to send the protocol-adapted data to the second chiplet via second port.

19. The integrated circuit chip of claim 18, wherein the first communication protocol or the second communication protocol is one of peripheral component interconnect express (PCIe), compute express link (CXL), cache coherent interconnect for accelerators (CCIX), TileLink, or a custom protocol.

20. The integrated circuit chip of claim 18, wherein the protocol bridge is further configured to, in response to determining that the first chiplet and the second chiplet support a same communication protocol, send the adapted data to the second chiplet via second port without converting the adapted data from the first communication protocol to the second communication protocol.

* * * * *